US 7,247,195 B2

(12) United States Patent
Dodge et al.

(10) Patent No.: US 7,247,195 B2
(45) Date of Patent: *Jul. 24, 2007

(54) DYE SETS FOR INK-JET INK IMAGING

(75) Inventors: Tye Dodge, Albany, OR (US); Linda C. Uhlir-Tsang, Corvallis, OR (US); Hiang P Lauw, Corvallis, OR (US); Matthew Thornberry, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/076,199

(22) Filed: Mar. 9, 2005

(65) Prior Publication Data

US 2006/0201386 A1  Sep. 14, 2006

(51) Int. Cl.
  C09D 11/02 (2006.01)
  C09B 47/04 (2006.01)
  C09B 45/00 (2006.01)
  C09B 31/08 (2006.01)

(52) U.S. Cl. .............................. 106/31.48; 106/31.49; 106/31.5; 8/661; 8/674; 8/681

(58) Field of Classification Search ............. 106/31.48, 106/31.49, 31.5; 8/661, 674, 681
  See application file for complete search history.

(56) References Cited

U.S. PATENT DOCUMENTS

| 5,118,350 A | 6/1992 | Prasad |
| 6,053,969 A | 4/2000 | Lauw et al. |
| 6,149,722 A | 11/2000 | Robertson et al. |
| 6,379,441 B1 * | 4/2002 | Kanaya et al. ........... 106/31.49 |
| 6,521,030 B1 * | 2/2003 | Stoffel ..................... 106/31.27 |
| 6,521,032 B1 | 2/2003 | Lehmann et al. |
| 6,540,821 B2 | 4/2003 | Adamic et al. |
| 6,559,292 B1 | 5/2003 | Mistry et al. |
| 6,569,212 B2 | 5/2003 | Carr |
| 6,673,140 B2 * | 1/2004 | Tyrell et al. ............... 106/31.5 |
| 6,706,100 B2 * | 3/2004 | Mafune et al. ......... 106/31.27 |
| 6,824,598 B2 * | 11/2004 | Thornberry et al. ..... 106/31.27 |
| 6,843,838 B2 * | 1/2005 | Zimmer et al. ......... 106/31.27 |
| 6,991,676 B2 * | 1/2006 | Kabalnov et al. ........ 106/31.48 |
| 6,997,978 B2 * | 2/2006 | Kabalnov et al. ........ 106/31.51 |
| 2002/0112641 A1 | 8/2002 | Naruse et al. |
| 2002/0130937 A1 | 9/2002 | Hadjisoteriou et al. |
| 2004/0074418 A1 * | 4/2004 | Mafune et al. ......... 106/31.27 |
| 2004/0216638 A1 | 11/2004 | Rolly |
| 2005/0115458 A1 * | 6/2005 | Oki et al. ................ 106/31.47 |

FOREIGN PATENT DOCUMENTS

| EP | 0 985 716 A1 | 3/2000 |
| EP | 1 164 174 A | 12/2001 |
| WO | WO 2004/046265 | 6/2004 |
| WO | WO 2004/050778 A | 6/2004 |
| WO | WO 2005/010110 A | 2/2005 |

* cited by examiner

*Primary Examiner*—Helene Klemanski

(57) ABSTRACT

The present invention is drawn to dye sets for formulating ink-jet inks, including ink sets having six ink-jet inks. In one embodiment, the dye set can comprise a yellow dye for formulating a yellow ink, a pair of magenta dyes for formulating a magenta ink and a pale magenta ink, a pair of cyan dyes for formulating a cyan ink and a pale cyan ink, and a black dye for formulating a black ink-jet ink. The pair of magenta dyes can be a transition metal-containing azo dye and a non-metallized dye. The pair of cyan dyes can be a first copper phthalocyanine dye and a second copper phthalocyanine dye that is different than the first copper phthalocyanine dye.

25 Claims, No Drawings

DYE SETS FOR INK-JET INK IMAGING

FIELD OF THE INVENTION

The present invention is drawn to the area of ink-jet imaging. More specifically, the present invention is drawn to dye sets configured to provide improved air fade resistance and light fastness, while maintaining high gamut volume, appropriate hue values, high chroma, and/or low bronzing.

SUMMARY OF THE INVENTION

It has been recognized that it would be advantageous to develop dye sets that can be used in typical ink vehicles, as well as more specific ink vehicles, and which exhibit acceptable air fade resistance, gamut, light fastness, chroma, reliability, materials compatibility, jettability, etc. As such, a dye set for formulating ink-jet inks can comprise a black dye having the structure of Formula I, as follows:

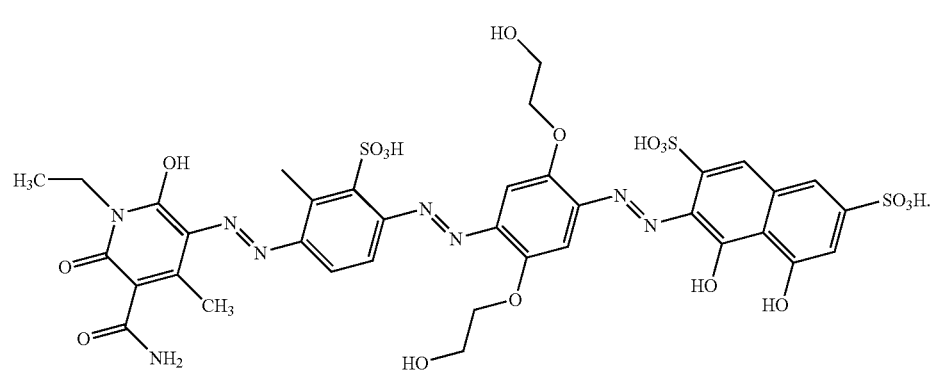

BACKGROUND OF THE INVENTION

In general, ink-jet inks are either dye- or pigment-based inks. Both are typically prepared in an ink vehicle that contains the dye and/or the pigment. Dye-based ink-jet inks generally use a soluble colorant that is usually water-based to turn the media a specific color. Conversely, pigmented inks typically use an insoluble or dispersed colorant to achieve color.

Color characteristics of dye-containing inks play an important role in the quality of the printed ink-jet image. Perceived color quality can be characterized using any one of several color space systems, such as CIELAB, as is well known in the art. With respect to CIELAB color space, a color is defined using three terms L*, a*, and b*. With this system, L* defines the lightness of a color, and it ranges from 0 to 100 (with 100 being white). Additionally, the terms a* and b*, together, define the hue, where a* ranges from a negative number (green) to a positive number (red), and b* ranges from a negative number (blue) to a positive number (yellow). Additional terms such as h° (hue angle) and C* (chroma) are used to further describe a given color, as is known to those skilled in the art. A single ink-jet ink of a first color that has good chroma, gamut, hue angle, and light fastness is not always optimal for use with other colors. In other words, not only does an individual color, i.e., cyan, magenta, or yellow, have to have acceptable color qualities, but the ink-set in which it is used also plays a role in whether the ink-jet ink performs in an acceptable manner. Thus, the appropriate combining of certain dyes together for use in an ink-set can improve image quality.

Accordingly, investigations continue into developing dye sets that have improved properties and that do not improve one property at the significant expense of the others.

Additionally, at least one colored dye selected from the group consisting of a cyan dye, a magenta dye, and a yellow dye can also be present in the dye set. The cyan dye that can be present has a structure shown in Formula II, as follows:

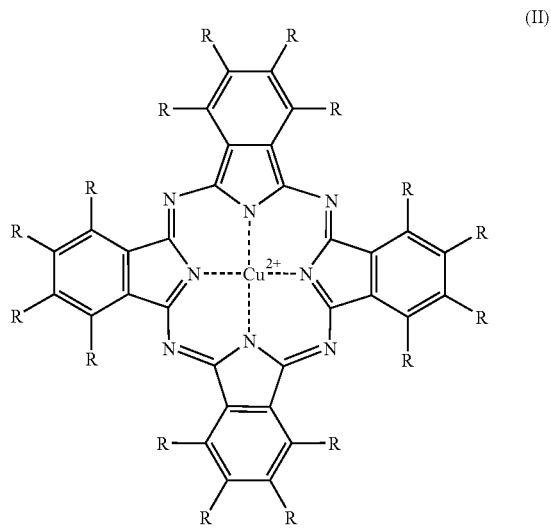

wherein each R group is independently selected from the group consisting of H, $SO_3H$, $SO_2NH_2$, and $SO_2NH$-alkyl-OH, with the proviso that an average of from 2 to 6 R groups are other than H. In this particular embodiment, there is no particular limitation placed on how many average $SO_3H$, $SO_2NH_2$, or $SO_2NH$-alkyl-OH groups are present, provided the average of all groups is from 2 to 6. The magenta dye that can be present $Ni^{2+}$ complex of the structure shown in Formula III, as follows:

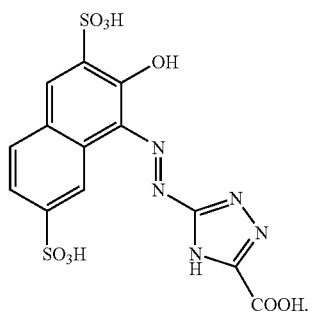

The yellow dye that can be present has a structure shown in Formula IV, as follows:

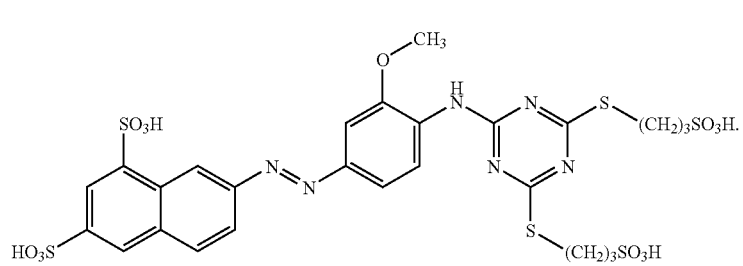

In another embodiment, a dye set for formulating ink-jet inks can comprise a first cyan dye and a second cyan dye, each having the same general chemical formula of Formula II:

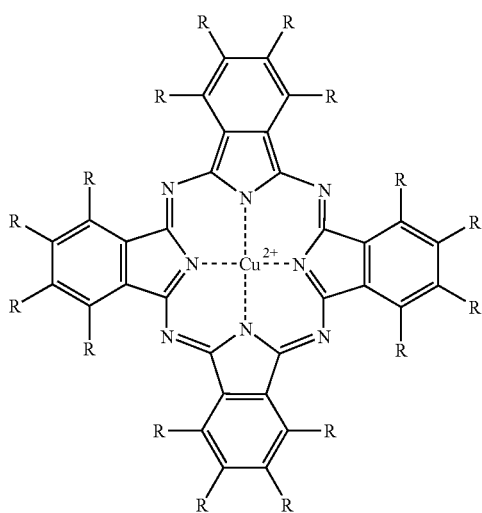

wherein each R group is independently selected from the group consisting of H, $SO_3H$, $SO_2NH_2$, and $SO_2NH$-alkyl-OH, with the proviso that an average of from 2 to 6 R groups are other than H. The first cyan dye can have an average of 0.25 to less than 1.5 of the $SO_2NH$-alkyl-OH groups, and the second cyan dye can have an average of 1.5 to 3 of the $SO_2NH$-alkyl-OH groups.

In another embodiment, a dye set can comprise a pair of magenta dyes for formulating a magenta ink and a pale magenta ink, wherein the pair of magenta dyes is used to formulate the magenta ink, and where only one of the pair of magenta dyes is used to formulate the pale magenta ink.

In still another embodiment, a dye set for formulating an ink set having at least six ink-jet inks can comprise a yellow dye, a pair of magenta dyes, a pair of cyan dyes, and a black dye. The pair of magenta dyes can be used to formulate a magenta ink and a pale magenta ink, wherein the pair of magenta dyes are a transition metal-containing azo dye and a non-metallized dye. The pair of cyan dyes can be used to formulate a cyan ink and a pale cyan ink, wherein the pair of cyan dyes are a first copper phthalocyanine dye and a second copper phthalocyanine dye that is different than the first copper phthalocyanine dye.

Additional features and advantages of the invention will be apparent from the detailed description which illustrates, by way of example, features of the invention.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

As used herein, "vehicle" refers to the fluid in which the colorant is placed to form an ink. Liquid vehicles are well known in the art, and a wide variety of such vehicles may be used in accordance with embodiments of the present invention. Liquid vehicles can include a mixture of a variety of different agents, including without limitation, surfactants, organic solvents and co-solvents, buffers, biocides, viscosity modifiers, sequestering agents, stabilizing agents, anti-kogation agents, and water. Though not part of the liquid vehicle per se, in addition to the colorants, the liquid vehicle can carry solid additives such as polymers, latexes, UV curable materials, plasticizers, salts, etc.

The term "metallized dye" includes dyes that have a transition metal that is chelated, coordinated, or complexed to the dye molecule as an integral part of the dye structure. Metallized dyes do not include dyes that merely include a metal counter ion. For example, DB199Na is a copper phthalocyanine dye having a sodium counter ion. The copper component makes this particular dye a "metallized" dye, whereas the sodium counter ion does not.

Likewise, the term "non-metallized dye" refers to dyes that do not include a transition metal that is chelated, coordinated, or complexed to the dye molecule. Thus, AR52Na is a sodium salt of Acid Red 52, but is not considered to be metallized in accordance with embodiments of the present invention.

When referring to pale cyan inks and pale magenta inks, the term "pale" is a relative term, where the ink is compared to its non-pale counterpart. For example, a pale magenta would have a higher L* value than a magenta ink it is compared with. Likewise, a pale cyan ink would also have a higher L* value than the cyan ink it is compared with. Other values of the L*a*b* color space can optionally also be different, though not required.

The term "about" when referring to a numerical value or range is intended to encompass the values resulting from experimental error that can occur when taking measurements.

Numerical values, such as ratios, concentrations, amounts, molecular sizes, etc., may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

unique of themselves, and all of which are unique in the context of the dye sets of the present invention. Each of the dyes of the dye sets are described herein individually, though it is understood that these dyes are presented herein primarily in the context of their respective dye sets. Further, when referring to an ink or an ink-jet ink, dyes are understood to be admixed within a liquid vehicle to form its respective ink. As described, dye sets are combinations of dyes that can be individually present or blended for inclusion in liquid vehicles. Each dye or dye blend of the dye set can be present in the same or similar type of liquid vehicle, or each dye or dye blend can be present in a distinct liquid vehicle that has a unique formulation. Further, though specific dye set combinations are disclosed herein, it is to be understood that various additional dyes can optionally be added to the dye sets (to form additional inks or to be combined with dyes of the dye set in common inks). For example, the dyes of the dye set can further comprise other phthalocyanine dyes such as DB199, Acid Blue dyes, Direct Blue dyes, etc., blended therewith. Other combinations with respect to the black, magenta, and yellow dyes can also be utilized in accordance with embodiments of the present invention.

Generally, the dye sets described herein include individual dyes that provide long term ink-jet ink reliability. Because of their effective reliability in certain liquid vehicles, they are suitable dyes for use in off-axis printers, though they can also be used in more conventional printers. As off-axis printers have a permanent ink-jet printhead and only the ink supply is replaced, there is a need to provide long term printhead reliability. Thus, the selection of specific dyes (and associated liquid vehicles) can be significant in achieving this goal. Further, it is also desirable to provide dyes in a dye set that can be used to generate more robust prints that are resistant to both air fade and light fade. The dye sets of the present invention provide a good balance between good photo image quality on specialty photo papers, e.g., swellable and inorganic porous media, as well as good image quality when printed on plain paper.

In accordance with this, in one embodiment, a dye set for formulating ink-jet inks can comprise a black dye having the structure of Formula I, as follows:

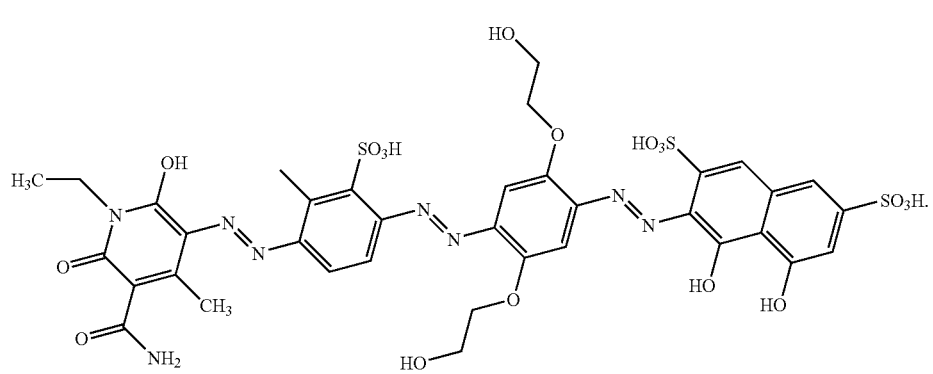

(I)

With this in mind, the present invention is drawn to the area of ink-jet imaging. More specifically, the present invention is drawn to dye sets for use with ink-jet ink vehicles. These dye sets include multiple dyes, some of which are Additionally, at least one colored dye selected from the group consisting of a cyan dye, a magenta dye, and a yellow dye can also be present in the dye set. The cyan dye has a structure shown in Formula II, as follows:

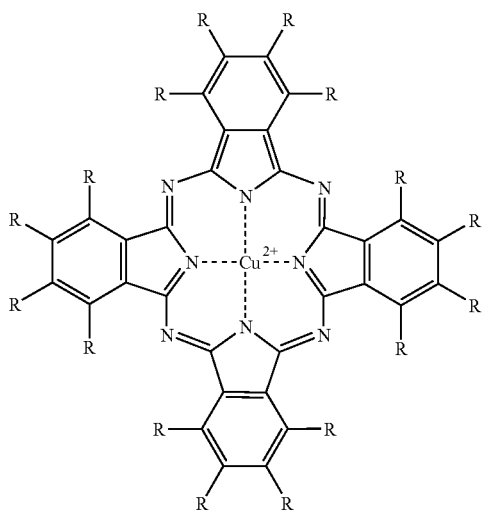

(II)

wherein each R group is independently selected from the group consisting of H, $SO_3H$, $SO_2NH_2$, and $SO_2NH$-alkyl-OH, with the proviso that an average of from 2 to 6 R groups are other than H. In this particular embodiment, there is no particular limitation placed on how many average $SO_3H$, $SO_2NH_2$, or $SO_2NH$-alkyl-OH groups are present, provided the average of all groups is from 2 to 6. The magenta dye is the $Ni^{2+}$ complex of the structure shown in Formula III, as follows:

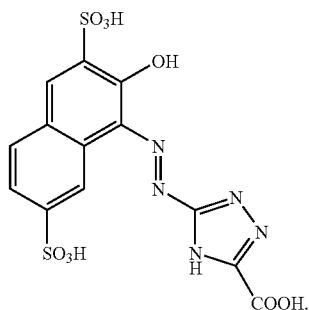

(III)

The yellow dye has a structure shown in Formula IV, as follows:

The black dye of Formula I is beneficial for use in full color dye sets, and also, provides excellent black text printing capabilities. Further, this black dye has excellent optical density on plain paper and photo media, such as inorganic porous-coated media and swellable media, and can be formulated in certain liquid vehicles to provide laser-quality black text.

In another embodiment, a dye set for formulating ink-jet inks can include a first cyan dye and a second cyan dye, each having the same general chemical formula, but each being different with respect to certain pendent functional groups attached to the aromatic ring structures, as shown in Formula II:

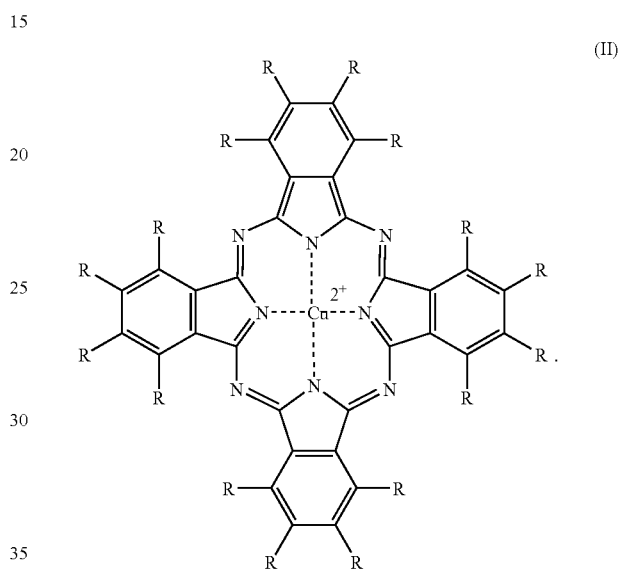

(II)

In Formula II above, the dye includes a copper (II) phthalocyanine core. With respect to both the first cyan dye and the second cyan dye, it is the R group selection that defines the difference between the two specific dyes disclosed herein. With respect to both dyes, each R group is independently selected from the group consisting of H, $SO_3H$, $SO_2NH_2$, and $SO_2NH$-alkyl-OH, with the proviso that an average of from 2 to 6 R groups are other than H. However, in this particular embodiment, with respect to the first cyan dye, there is an average of 0.25 to less than 1.5 of the $SO_2NH$-alkyl-OH groups, and with respect to the second cyan dye, there is an average of 1.5 to 3 of the $SO_2NH$-alkyl-OH groups. It is notable that with respect to this particular embodiment where the dye set includes two different cyan dyes of the same general chemical formula,

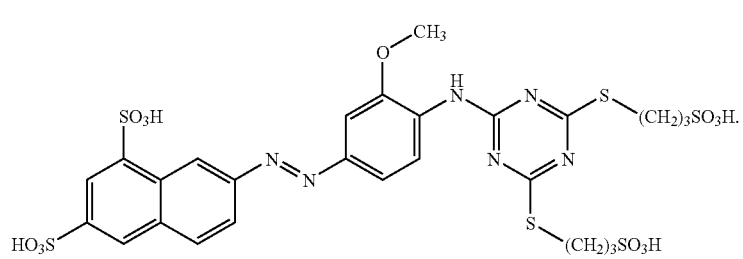

(IV)

unlike the previous embodiment that more generally utilizes the dye of Formula II, the $SO_2NH$-alkyl-OH group for each of the first cyan dye and the second cyan dye is present at an average range that does not overlap. By "alkyl" what is meant is lower alkyl having from 1 to 4 carbon atoms.

With more detail regarding the first cyan dye, in one embodiment, pendent to the phthalocyanine core, there can be an average of from 1 to 4 $SO_3H$ groups functionalized on the dye, an average of from 0.25 to 2 $SO_2NH_2$ groups functionalized on the dye, and an average of from 0.25 to less than 1.5 $SO_2NH$-alkyl-OH groups functionalized on the dye. In one embodiment, an average of about four total R groups other than H can be present. To cite one specific dye that is useful for use as the first cyan dye, pendent to the phthalocyanine core, there can be an average of about 1.8 $SO_3H$ groups functionalized on the dye, an average of about 1 $SO_2NH_2$ groups functionalized on the dye, and/or an average about 1.2 $SO_2NH$-alkyl-OH groups functionalized on the dye. In this specific example, the alkyl group of the $SO_2NH$-alkyl-OH group can be ethyl.

With more detail regarding the second cyan dye, in one embodiment, pendent to the phthalocyanine core, there can be an average of from 0.25 to 2 $SO_3H$ groups functionalized on the dye, an average of from 0.25 to 2.5 $SO_2NH_2$ groups functionalized on the dye, and an average of from 1.5 to 3 $SO_2NH$-alkyl-OH groups functionalized on the phthalocyanine dye core. In one embodiment, an average of about four total R groups other than H can be present. To cite one specific dye that is useful for use as the first cyan dye, pendent to the phthalocyanine core, there can be an average of about 1 $SO_3H$ groups functionalized on the dye, an average of about 1.2 $SO_2NH_2$ groups functionalized on the dye, and/or an average of about 1.8 $SO_2NH$-alkyl-OH groups functionalized on the dye. In this specific example, the alkyl group of the $SO_2NH$-alkyl-OH group can be ethyl.

In each of the above embodiments, an emphasis is placed on average numbers of pendent groups attached to each phthalocyanine core. By "average," what is meant is that the totality of any given pendent group in a dye lot or batch will yield a value within the stated average numerical range. For example, a pendent group range of 0.5 to 1 means that some molecules of a dye batch can be void of that pendent group, and others can contain 1 or more of that pendent group. Thus, one dye batch can have a 0.5 average value, and another dye batch can have a 1 average value, and both batches would be within the recited range.

The cyan dyes of Formula II provide excellent air fade and light fade resistance, while minimizing bronzing. Bronzing is the metallic sheen that can occur on any printed region of an ink-jet produced print, but particularly occurs in black, cyan, and/or blue print areas. Further, this dye is effective for use on swellable media, inorganic porous media, plain paper, and other substrates. Achieving both air fade resistance and bronzing resistance at this time is difficult. In general, more fade resistant dye molecules tend to bronze more heavily. It has been discovered that the ratio of functional groups, i.e. R groups, as well as the dye load, can affect bronzing. Thus, carefully selecting these parameters can improve image quality and longevity.

In another embodiment, a dye set for formulating inkjet inks can comprise a pair of magenta dyes for formulating a magenta ink and a pale magenta ink. In this embodiment, both dyes of the pair of magenta dyes are used to formulate the magenta ink, and only one dye of the pair of magenta dyes is used to formulate the pale magenta ink. In one embodiment, the pair of magenta dyes can include a transition metal-containing azo dye and/or a non-metallized dye. In a more specific embodiment, the transition metal can be nickel, and the transition metal-containing azo dye is the $Ni^{2+}$ complex of the structure set forth in Formula III, as follows:

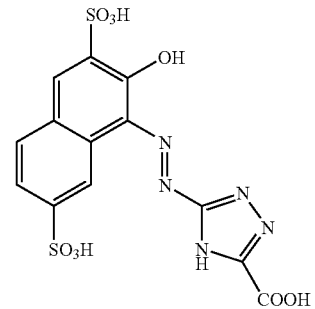

Formula III

To obtain excellent color, typically, more chromatic dyes are selected. However, more chromatic dyes often have poor light fastness. In accordance with one exemplary embodiment related to the magenta dye set described herein, this problem can be solved by carefully blending the dye of Formula III with a second type of dye, namely a non-metallized xanthene dye commonly referred to as AR52Na. Thus, the AR52, which is a very highly chromatic dye, can be used to provide vivid color to a magenta ink, and the Formula III dye can be used to provide improved image permanence to the same ink. With respect to pale magenta inks, as high chroma or vivid color is not as necessary, pale magenta ink-jet inks can be formulated using only the dye of Formula III, for example.

Each of the dye sets of the present invention typically includes a yellow dye as well. Though any yellow dye that is functional can be used, the yellow dye, in one embodiment, can have the structure shown in Formula IV, as follows:

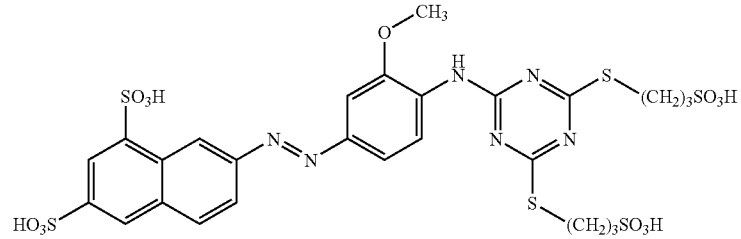

As described, each of the Formula I-IV dyes can all be present in a common dye set, or they can be present with other dyes known to those skilled in the art. Additionally, these dyes can be used to formulate ink set types that are commonly known in the art, including ink sets containing two, three inks, four inks, five inks, six inks, etc. More specifically, ink sets containing two, three, four, five, or six ink sets are common in the industry and the cyan-magenta-yellow-black dye sets described herein could be incorporated into such a system.

In one embodiment, a dye set for formulating an ink set having at least six ink-jet inks can comprise various dyes for formulating respective ink-jet inks. The dyes can include a yellow dye, a pair of magenta dyes, a pair of cyan dyes, and a black dye. The pair of magenta dyes can be used to formulate a magenta ink and a pale magenta ink, wherein the pair of magenta dyes is a transition metal-containing azo dye and a non-metallized dye. The pair of cyan dyes can be used to formulate a cyan ink and a pale cyan ink, wherein the pair of cyan dyes is a first copper phthalocyanine dye and a second copper phthalocyanine dye that is different than the first copper phthalocyanine dye. This combination of dyes can utilize one or more of the dyes described in Formulas I-IV, or can utilize other dyes in accordance with this embodiment.

With respect to the pair of cyan dyes of this embodiment, the first copper phthalocyanine dye can be configured to formulate a cyan ink, and the second copper phthalocyanine dye can be configured to formulate the pale cyan ink. Exemplary dyes that can be used include the dyes shown and described in Formula II, where the $SO_2NH$-alkyl-OH groups for each of the first cyan dye and the second cyan dye is present at an average range that does not overlap. With respect to the pair of magenta dyes, in one embodiment, a portion of the transition metal-containing azo dye and the non-metallized dye can be blended to formulate a magenta ink, and a portion of the transition metal-containing azo dye can be used alone to formulate a pale magenta ink. The dye shown in Formula III can be used as the transition metal-containing azo dye, and a salt of Acid Red 52, e.g., AR52, can be used as the non-metallized dye. In still another embodiment, the black dye can be any black dye, including the black dye shown in Formula I. Further, the yellow dye can be any suitable yellow dye, including the yellow dye shown in Formula IV.

As mentioned, the dye sets of the present invention can be formulated in ink-jet ink sets. Dye concentrations for each dye of the dye set can vary, depending on the type of ink that is to be formulated. For example, a heavier dye load (higher dye concentration) can be present in the cyan and magenta inks compared to the pale cyan and pale magenta inks, respectively. Generally, for most cyan and magenta inks, the dye concentration, for example, can be from about 0.1 wt % to about 10 wt %. For the pale cyan and the pale magenta inks, the dye concentration can be from about 0.1 wt % to about 6 wt %. With respect to the black ink-jet ink, the black dye concentration can be from about 0.1 wt % to about 10 wt %, and with respect to the yellow ink-jet ink, the yellow dye concentration can be from about 0.1 wt % to about 10 wt %. These dye sets can be used to formulate ink sets, including ink-jet ink sets. As such, ink sets for printing ink-jet images can be used with commercially available ink-jet printers, such as DESKJET™ or PHOTOSMART™ and other similar printers manufactured by Hewlett-Packard Company. It is notable that these inks are acceptable for use with both thermal ink-jet ink printers and piezo ink-jet printers. These ink sets can also produce true colors on a variety of media, including uncoated media, clay coated media, inorganic porous coated media, e.g., silica- and alumina-based media, and organic swellable media, e.g., gelatin coated media, each with improved light fastness, gamut, and other print quality enhancements.

As mentioned, in some embodiments of the present invention, each color dye or black dye of the dye set, namely black, cyan, yellow, and magenta, can be present in more than one ink, each having more than one dye load. That is, there can be one or more ink-jet reservoir(s) filled for each ink color, each reservoir having an ink therein which can have a different dye load, a different dye, different vehicle components, different amounts of vehicle components, etc. For example, there can be two magenta reservoirs, each containing inks with a different dye load and/or a different magenta dye.

A typical liquid vehicle formulation that can be used with a dye set of the present invention can include one or more organic co-solvent(s), present in total at from 5.0% to 50.0% by weight, and one or more non-ionic, cationic, and/or anionic surfactant(s), present from 0.01% to 10.0% by weight. The balance of the formulation can be purified water, or other vehicle components known in the art such as biocides, viscosity modifiers, pH adjusting agents, sequestering agents, preservatives, anti-kogation agents, bleed control agents, drying agents, jettability agents, and the like.

Classes of solvents or co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include 2-pyrrolidinone, derivatized 2-pyrrolidinone including 1-(2-hydroxyethyl)-2-pyrrolidinone, 2-methyl-1,3-propanediol, tetraethylene glycol, and ethylhydroxypropanediol (EHPD), to name a few.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. Specific examples of preferred surfactants for use include SOL-SPERSE™, TERGITOL™, DOWFAX™, and the like. The amount of surfactant added to the formulation of this invention may range from 0.01% to 10.0% by weight.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable anti-microbial agents include, but are not limited to, NUOSEPT™, UCARCIDE™, VANCIDE™, PROXEL™, and combinations thereof.

Sequestering agents, such as EDTA (ethylenediaminetetraacetic acid), may be included to eliminate the deleterious effects of metal impurities. Such sequestering agents typically comprise from 0 wt % to 2 wt % of the ink-jet ink compositions. Viscosity modifiers may also be present, as well as other additives known to those skilled in the art to modify properties of the ink as desired. Such additives can be present in the ink-jet ink compositions at from 0 wt % to 20 wt %.

Various buffering agents or pH adjusting agents can also be optionally used in the ink-jet ink compositions of the present invention. Typical pH adjusting agents include such pH control solutions as hydroxides of alkali metals and amines, such as lithium hydroxide, sodium hydroxide, potassium hydroxide; citric acid; amines such as triethanolamine, diethanolamine, and dimethyl-ethanolamine; hydrochloric acid; and other basic or acidic components. If used, pH adjusting agents typically comprise less than about 10 wt % of the ink-jet ink composition. Similarly, buffering agents can be used such as, but not limited to, TRIS, MOPS, citric acid, acetic acid, MES, etc. If used, buffering agents typically comprise less than about 3 wt % of the ink-jet ink composition, and generally from about 0.01 wt % to 2 wt %, most commonly from 0.2 wt % to 0.5 wt %. Additionally, anti-kogation agents that can be used include lithium phosphate, sodium phosphate, phosphate esters of fatty alcohol alkoxylates, and the like, in amounts from about 0.01 wt % to 5 wt %.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following Examples provide further detail in connection with what are presently deemed to be the most practical and preferred embodiments of the invention.

Example 1

Inks Prepared Using an Exemplary Dye Set in Accordance with Embodiments of the Present Invention A dye set including a black dye in accordance with Formula I, two different cyan dyes in accordance with Formula II, a magenta dye in accordance with Formula III, an Acid Red 52 disodium salt dye, and a yellow dye in accordance with Formula IV were used to prepare an ink set. The inks are set forth in Table 1-6, as follows:

TABLE 1

Black Ink

| Component | Amount |
|---|---|
| 1-(2-hydroxyethyl)-2-pyrrolidinone | 5-20 wt % |
| 2-pyrrolidinone | 5-20 wt % |
| Solsperse surfactant (Avecia) | 0.25 wt % |
| Li-phosphate | 0.1 wt % |
| Ethylenediaminetetraacetic acid (disodium salt) | 0.1 wt % |
| 4-morpholine propane sulfonic acid (free acid) | 0.2 wt % |
| Proxel GXL (Avecia) | 0.1 wt % |

TABLE 1-continued

Black Ink

| Component | Amount |
|---|---|
| Formula I dye | 2-5 wt % |
| Target pH | 7-7.5 |

TABLE 2

Cyan Ink

| Component | Amount |
|---|---|
| 1-(2-hydroxyethyl)-2-pyrrolidinone | 5-20 wt % |
| 2-methyl-1,3-propanediol | 5-9.8 wt % |
| Ethoxylated surfactant | 0.75-3.25 wt % |
| Anionic alkyldiphenyloxide disulfonate | 0.3-9 wt % |
| Sodium phosphate dodecahydrate | 0.167 wt % |
| Ethylenediaminetetraacetic acid (disodium salt) | 0.1 wt % |
| Tris(hydroxymethyl)aminomethane | 0.2 wt % |
| Proxel GXL (Avecia) | 0.1 wt % |
| Formula II dye[1] | 1-5 wt % |
| Target pH | 8-8.5 |

[1]Average of 1.2 $SO_2NHCH_2CH_2OH$ groups

TABLE 3

Magenta Ink

| Components | Amount |
|---|---|
| 1-(2-hydroxyethyl)-2-pyrrolidinone | 5-20 wt % |
| 2-methyl-1,3-propanediol | 5-9.8 wt % |
| Ethoxylated surfactant | 0.75-3.25 wt % |
| Anionic alkyldiphenyloxide disulfonate | 0.3-9 wt % |
| Ethylenediaminetetraacetic acid (disodium salt) | 0.75 wt % |
| Tris(hydroxymethyl)aminomethane | 0.2 wt % |
| Proxel GXL (Avecia) | 0.1 wt % |
| Formula III dye | 1-5 wt % |
| AR52-Na dye | 0.2-1 wt % |
| Target pH | 8-8.5 |

TABLE 4

Yellow Ink

| Components | Amount |
|---|---|
| 2-pyrrolidinone | 5-10 wt % |
| Tetraethylene glycol | 3-9 wt % |
| Ethylhydroxypropanediol (EHPD) | 3-9 wt % |
| Ethoxylated surfactant | 0.75-3.25 wt % |
| Anionic alkyldiphenyloxide disulfonate | 0.3-9 wt % |
| Ethylenediaminetetraacetic acid (disodium salt) | 0.1 wt % |
| 4-morpholine propane sulfonic acid (free acid) | 0.2 wt % |
| Proxel GXL (Avecia) | 0.1 wt % |
| Formula IV dye | 2-5 wt % |
| Target pH | 7-7.5 |

TABLE 5

Pale Cyan Ink

| Component | Amount |
|---|---|
| 1-(2-hydroxyethyl)-2-pyrrolidinone | 5-20 wt % |
| 2-methyl-1,3-propanediol | 5-9.8 wt % |
| Ethoxylated surfactant | 0.75-3.25 wt % |
| Anionic alkyldiphenyloxide disulfonate | 0.3-9 wt % |
| Phosphate ester of fatty alcohol alkoxylate | 0.4 wt % |

TABLE 5-continued

Pale Cyan Ink

| Component | Amount |
| --- | --- |
| Ethylenediaminetetraacetic acid (disodium salt) | 0.1 wt % |
| Tris(hydroxymethyl)aminomethane | 0.2 wt % |
| Proxel GXL (Avecia) | 0.1 wt % |
| Formula II dye[2] | 0.5-4 wt % |
| Target pH | 8-8.5 |

[2] Average of 1.8 SO$_2$NHCH$_2$CH$_2$OH groups

TABLE 6

Pale Magenta Ink

| Component | Amount |
| --- | --- |
| 1-(2-hydroxyethyl)-2-pyrrolidinone | 5-20 wt % |
| 2-methyl-1,3-propanediol | 5-9.8 wt % |
| Ethoxylated surfactant | 0.75-3.25 wt % |
| Anionic alkyldiphenyloxide disulfonate | 0.3-9 wt % |
| Tris(hydroxymethyl)aminomethane | 0.2 wt % |
| Proxel GXL (Avecia) | 0.1 wt % |
| Formula III dye | 0.5-4 wt % |
| Target pH | 8-8.5 |

While the invention has been described with reference to certain preferred embodiments, those skilled in the art will appreciate that various modifications, changes, omissions, and substitutions can be made without departing from the spirit of the invention. For example, though specific vehicles are shown for use in Example 1, other vehicles can also be used. It is intended, therefore, that the invention be limited only by the scope of the following claims.

What is claimed is:

1. A dye set for formulating ink-jet inks, comprising:
   (a) a black dye having a structure as in Formula I:

(I):

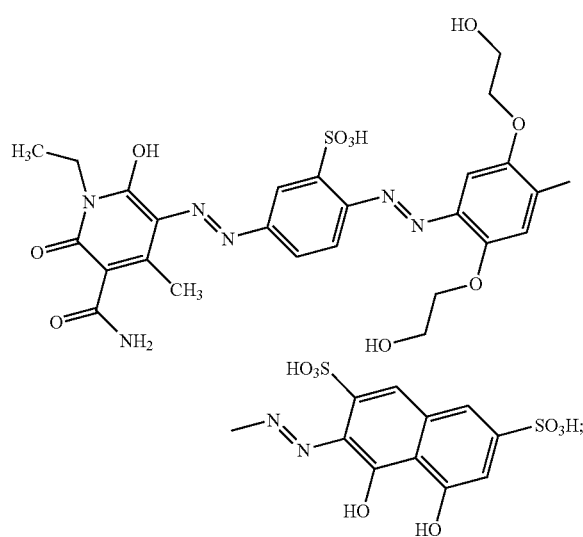

and
   (b) at least one colored dye selected from the group consisting of a cyan dye, a magenta dye, and a yellow dye, said cyan dye having a structure as in Formula II:

(II):

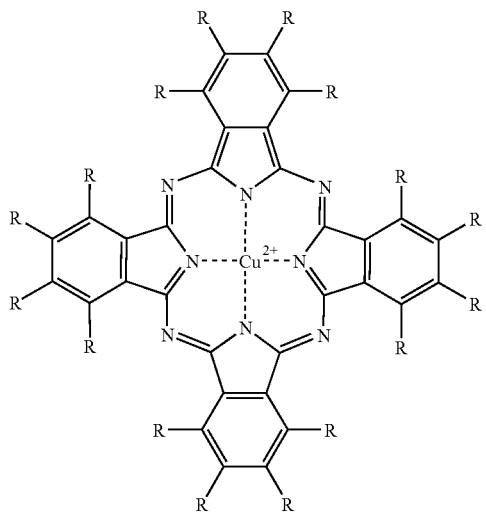

wherein each R group is independently selected from the group consisting of H, SO$_3$H, SO$_2$NH$_2$, and SO$_2$NH-alkyl-OH, with the proviso that an average of from 2 to 6 R groups are other than H, said magenta dye being a Ni$^{2+}$ complex of a structure as in Formula III:

(III):

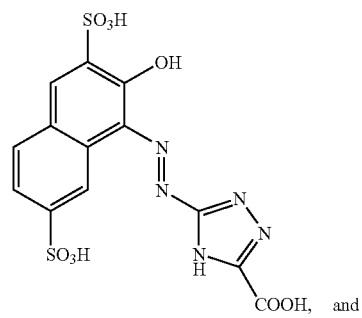

said yellow dye having a structure as in Formula IV, as follows:

(IV):

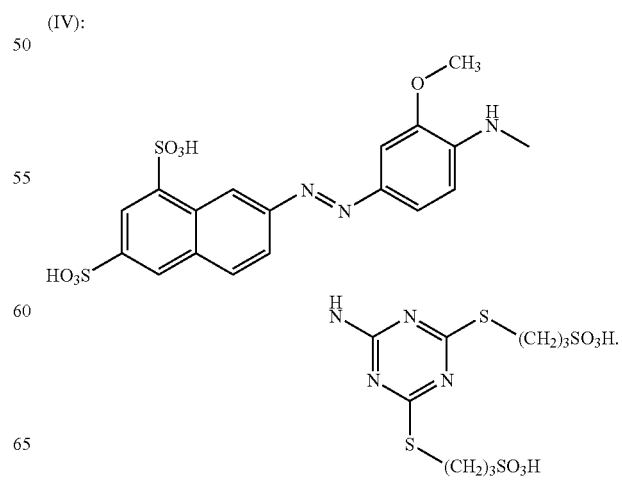

2. A dye set as in claim 1, wherein the at least one colored dye is the cyan dye of Formula II.

3. A dye set as in claim 1, wherein the at least one colored dye is the magenta dye of Formula III.

4. A dye set as in claim 1, wherein the at least one colored dye is the yellow dye of Formula IV.

5. A dye set as in claim 1, wherein the at least one colored dye includes the cyan dye of Formula II, the magenta dye of Formula III, and the yellow dye of Formula IV.

6. A dye set as in claim 3, further comprising a non-metallized magenta dye.

7. A dye set for formulating ink-jet inks including a first cyan dye and a second cyan dye, each having the same general chemical formula:

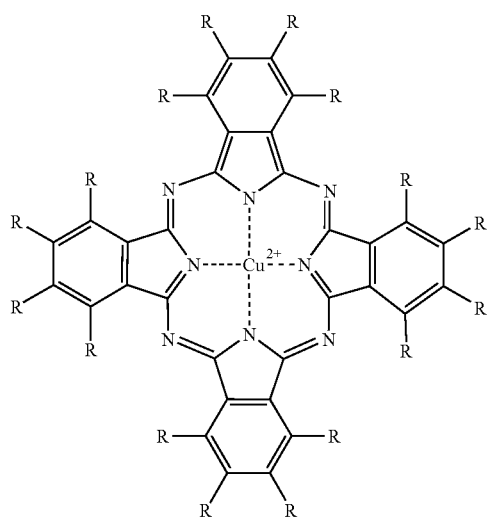

wherein each R group is independently selected from the group consisting of H, $SO_3H$, $SO_2NH_2$, and $SO_2NH$-alkyl-OH, with the proviso that an average of from 2 to 6 R groups are other than H, said first cyan dye having an average of 0.25 to less than 1.5 of the $SO_2NH$-alkyl-OH groups, and said second cyan dye having an average of 1.5 to 3 of $SO_2NH$-alkyl-OH groups.

8. A dye set as in claim 7, further comprising a black dye having the structure:

9. A dye set as in claim 7, further comprising a $Ni^{2+}$ complex of a magenta dye having the structure:

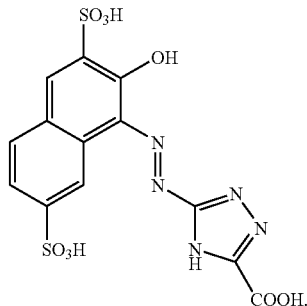

10. A dye set as in claim 7, further comprising a magenta dye, which is a non-metallized dye.

11. A dye set as in claim 7, further comprising a yellow dye having the structure:

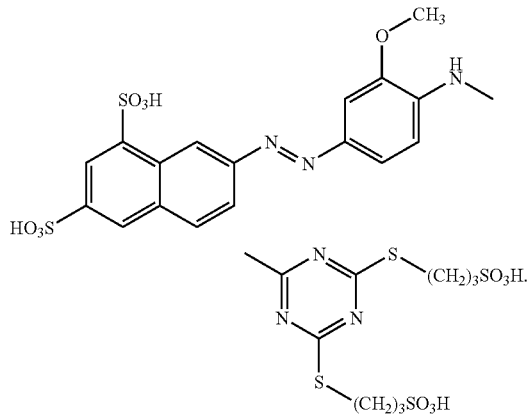

12. A dye set for formulating ink-jet inks, comprising a pair of magenta dyes for formulating a magenta ink and a pale magenta ink, wherein the pair of magenta dyes are used to formulate the magenta ink, where only one of the pair of magenta dyes is used to formulate the pale magenta ink, and wherein the pair of magenta dyes includes a transition metal-containing azo dye.

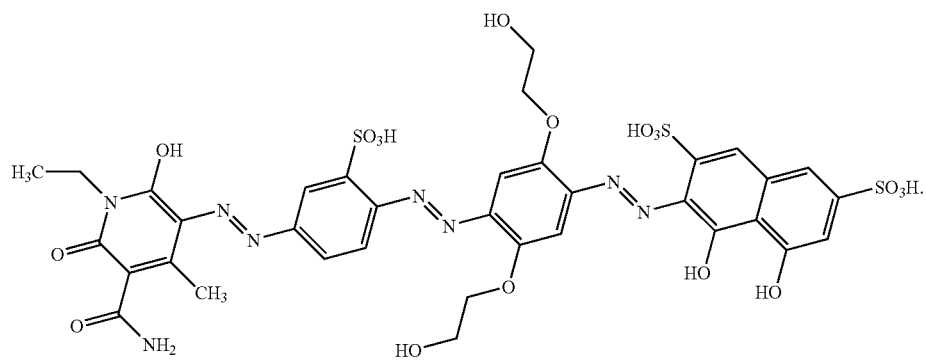

13. A dye set as in claim 12, wherein the transition metal is nickel, and wherein the transition metal-containing azo dye is a Ni$^{2+}$ complex of the structure:

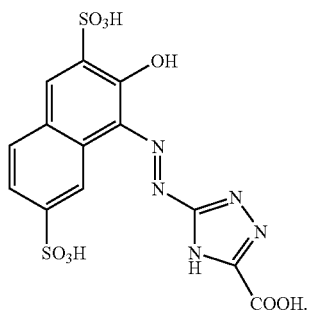

14. A dye set as in claim 12, further comprising a black dye having the structure:

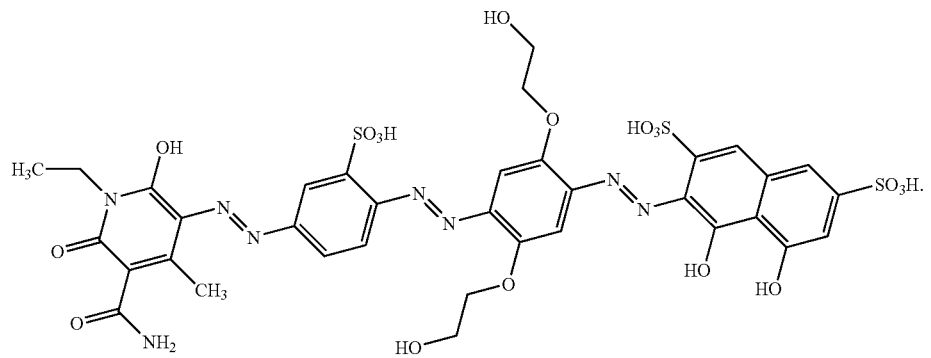

15. A dye set as in claim 12, further comprising a cyan dye having the structure:

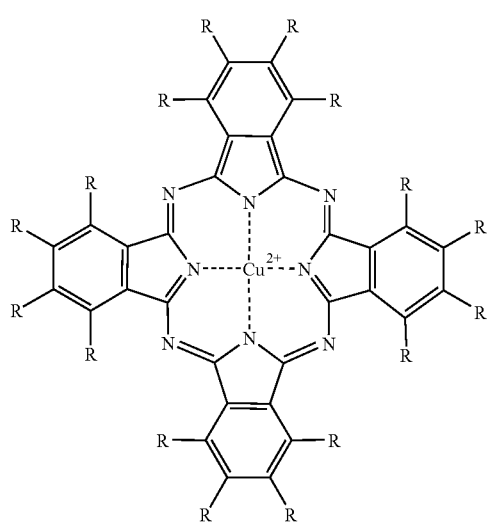

wherein each R group is independently selected from the group consisting of H, SO$_3$H, SO$_2$NH$_2$, and SO$_2$NH-alkyl-OH, with the proviso that an average of from 2 to 6 R groups are other than H.

16. A dye set as in claim 12, further comprising a yellow dye having the structure:

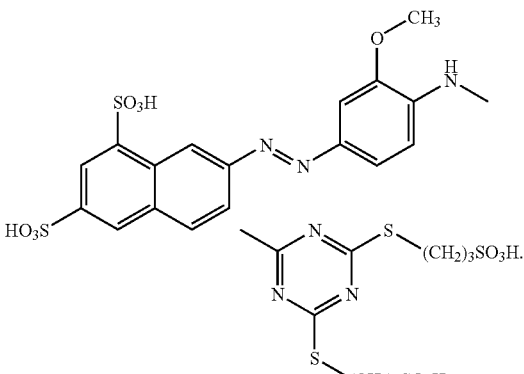

17. A dye set as in claim 12, wherein the pair of magenta dyes includes a first magenta dye that is more chromatic than a second magenta dye, and wherein the second magenta dye provides more image permanence than the first magenta dye, said first and second magenta dye being used to formulate the magenta ink, and said second magenta dye being used to formulate the pale magenta ink.

18. A dye set for formulating an ink set having at least six ink-jet inks, comprising:
   (a) a yellow dye for formulating a yellow ink;
   (b) a pair of magenta dyes for formulating a magenta ink and a pale magenta ink, said pair of magenta dyes being a transition metal-containing azo dye and a non-metallized dye;
   (c) a pair of cyan dyes for formulating a cyan ink and a pale cyan ink, said pair of cyan dyes being a first copper phthalocyanine dye and a second copper phthalocyanine dye that is different than the first copper phthalocyanine dye; and
   (d) a black dye for formulating a black ink-jet ink.

19. A dye set as in claim 18, wherein a portion of the transition metal-containing azo dye and the non-metallized dye are blended to formulate the magenta ink, and wherein a portion of the transition metal-containing azo dye is used to formulate the pale magenta ink without addition of the non-metallized dye.

20. A dye set as in claim 18, wherein the first copper phthalocyanine dye is configured to formulate the cyan ink, and wherein the second copper phthalocyanine dye is configured to formulate the pale cyan ink.

21. A dye set as in claim 18, wherein the black dye has the structure:

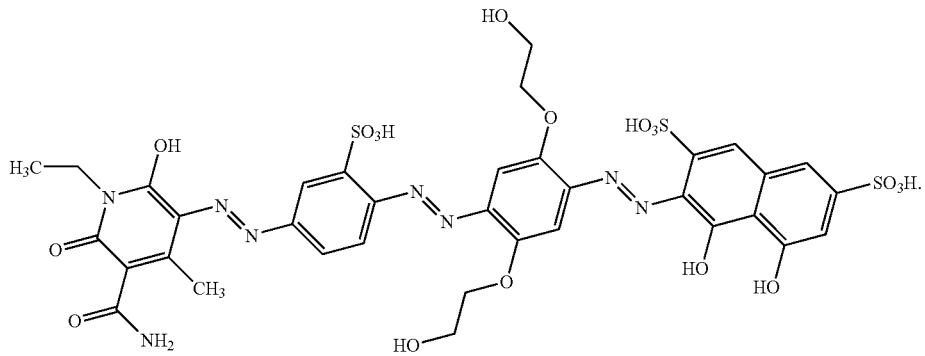

22. A dye set as in claim 18, wherein the transition metal-containing azo dye is a Ni$^{2+}$ complex of the structure:

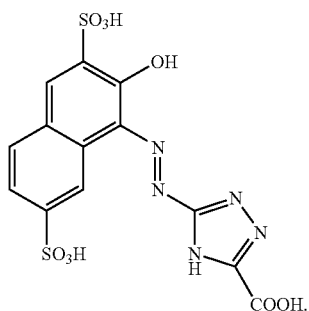

23. A dye set as in claim 18, wherein the non-metallized dye is a salt of Acid Red 52.

24. A dye set as in claim 18, wherein at least one of the cyan dyes has the structure:

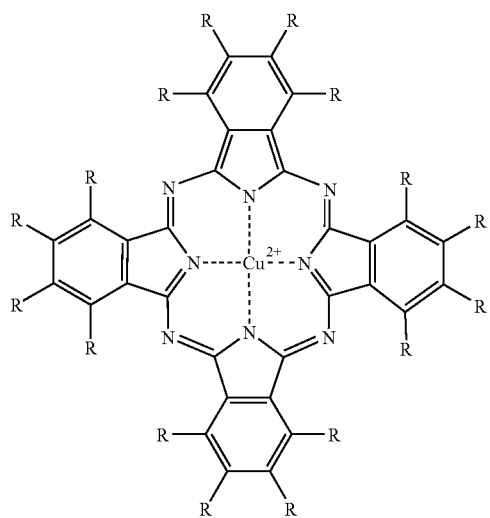

wherein each R group is independently selected from the group consisting of H, SO$_3$H, SO$_2$NH$_2$, and SO$_2$NH-alkyl-OH, with the proviso that an average of from 2 to 6 R groups are other than H.

25. A dye set as in claim 18, wherein the yellow dye has the structure:

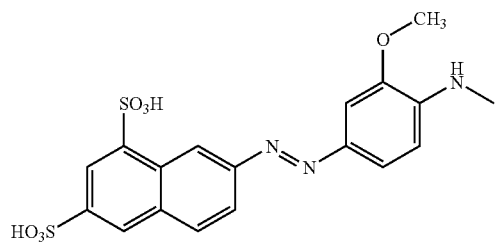

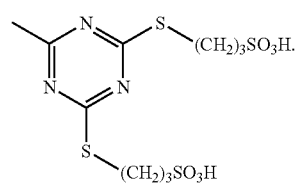

* * * * *

UNITED STATES PATENT AND TRADEMARK OFFICE
CERTIFICATE OF CORRECTION

PATENT NO.        : 7,247,195 B2
APPLICATION NO.   : 11/076199
DATED             : July 24, 2007
INVENTOR(S)       : Tye Dodge et al.

It is certified that error appears in the above-identified patent and that said Letters Patent is hereby corrected as shown below:

In column 13, line 52, delete "Formula II" and insert -- Formula III --, therefor.

In column 16, lines 50-65, in Claim 1, should read

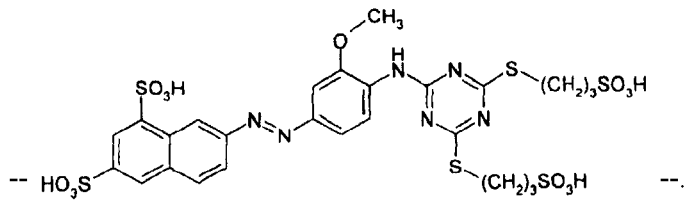

Signed and Sealed this

Twenty-second Day of June, 2010

David J. Kappos
*Director of the United States Patent and Trademark Office*